Nov. 8, 1966 E. J. SMITH 3,284,793

ANALOG TO BINARY CODED DECIMAL ENCODER

Filed Nov. 1, 1962 2 Sheets-Sheet 1

EDGAR J. SMITH
*INVENTOR.*

BY S. A. Giarratana
Francis L. Masselle
ATTORNEYS

EDGAR J. SMITH
INVENTOR.
BY S. A. Giarratana
Francis L. Masselle
ATTORNEYS

United States Patent Office 3,284,793

Patented Nov. 8, 1966

3,284,793

ANALOG TO BINARY CODED DECIMAL ENCODER

Edgar J. Smith, Verona, N.J., assignor to General Precision Inc., Little Falls, N.J., a corporation of Delaware Filed Nov. 1, 1962, Ser. No. 234,707
7 Claims. (Cl. 340—347)

The present invention relates to analog to binary encoders and more particularly to a special code for an analog to binary encoder which enables an accurate binary coded decimal output to be obtained despite relatively large gearing errors between the drums or discs of each decade of the decoder.

Binary decimal encoders employ a plurality of carriages, such as drums or discs, mechanically connected together by gears with a 10:1 ratio between adjacent carriages. Each carriage has ten decimal numbers per revolution and each carriage rotates one number when the next least significant carriage rotates through one complete revolution. Suitable code tracks are provided on each of the carriages to enable a binary coded decimal output to be obtained from an analog input in the form of a rotating shaft connected directly to the units carriage.

Prior to the present invention, binary decimal encoders used either odometer-type trip gearing, or spur gearing with dual brush reading of each track. The odometer gearing provided the necessary accuracy, but of course was much more expensive than spur gearing. The use of dual brushes in the spur gearing arrangement required eight code tracks per decade. In accordance with the present invention, a special code is provided which enables spur gearing to be employed, but only requires six code tracks per decade with one brush for each code track.

Accordingly, it is one object of the inevntion to produce a binary coded decimal output from an analog to digital shaft encoder.

It is another object of the invention to provide a code which can be used with an encoder having spur gearing with only one set of brushes needed per code track to produce a binary coded digital output from a rotating shaft input.

It is a further object of the invention to provide a special code for a binary decimal encoder which enables spur gearing to be employed with relatively large gearing errors between the carriages of the encoder without sacrificing accuracy.

It is a still further object of the invention to provide a special binary code as described above in which only one bit changes value between any two consecutive digital positions on the code.

It is a still further object of the invention to provide a special code as described above which has ten discrete values per revolution of each carriage, repeats itself each revolution, has no ambiguity problem due to normal brush and code tolerances, and can be used in a manner to overcome ambiguity between carriages when one carriage is close to generating a carry into the next decade.

It is a still further object of the invention to provide a binary decimal encoder which is simple and accurate, economical to manufacture, rugged in construction, and reliable in operation.

Other objects and features of novelty of the present invention will be specifically pointed out or will otherwise become apparent when referring, for a better understanding of the invention, to the following description taken in conjunction with the accompanying drawings, wherein.

Figure 1:
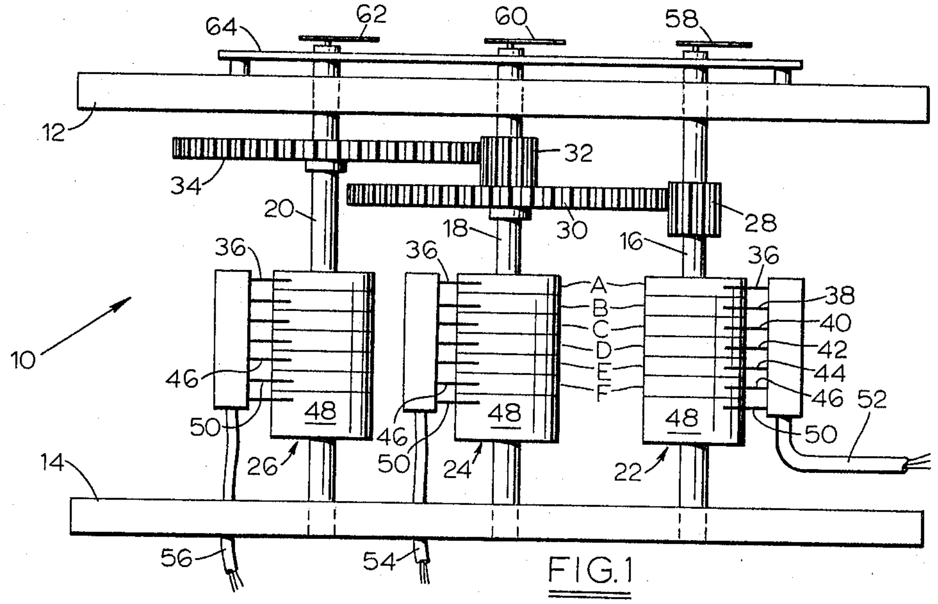
FIG. 1 is a side view of the decade drums and gearing employed in one embodiment of the invention.

Referring to FIG. 1, a three-decade unit 10 is illustrated which embodies features of the present invention. It comprises parallel spaced apart supports 12 and 14 having three drum shafts 16, 18, 20 rotatably journaled therebetween with drums 22, 24, 26 mounted on each of the drum shafts. Although only three drums are illustrated in this embodiment which would count from 0 to 999, it is to be specifically understood that there is no limit on the number of drums that can be employed. For example, five drums could just as well be employed for counting from 0 to 99,999. Also different types of carriages, such as discs for example, could be used in place of the drums.

The input rotation is applied to the drum shaft 16 and the drum 22 is the unit's drum. The drum 24 is driven by a pinion gear 28 on the drum shaft 16 and a large spur gear 30 on the drum shaft 18 with a 10:1 gear ratio so that the drum 24 rotates one revolution for every ten revolutions of the drum 22. Similarly the drum 26 is driven by a pinion gear 32 on the drum shaft 18 and a large spur gear 34 on the drum shaft 20 with a 10:1 gear ratio so that the drum 26 rotates one revolution for every ten revolutions of the drum 24. Consequently, the drum 26 rotates one revolution for each 100 revolutions of the drum 22.

Figure 2:
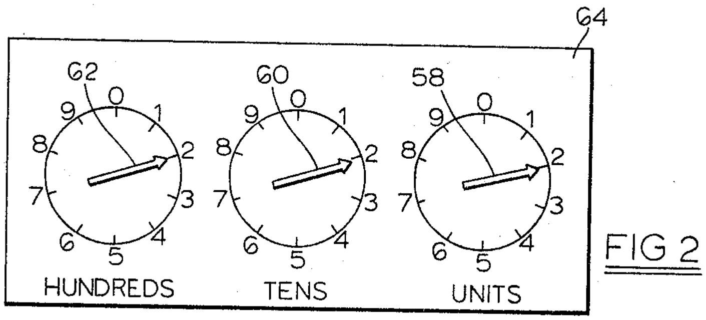
FIG. 2 is an end view of the structure illustrated in FIG. 1 showing the visual readout dials thereof.

Each drum has six annular code tracks A, B, C, D, E and F thereon, and the information on drum position is picked off by six brushes 36, 38, 40, 42, 44, 46 making sliding electrical contact each with a respective one of the code tracks A–F. A common track 48 is also provided around the bottom of each of the drums which is slidably engaged by a seventh brush 50. Electrical connection to the seven brushes associated with each drum is made through cables 52, 54, 56, respectively. If visual readout is desired, pointers 58, 60 and 62 may be attached to the upper end of each drum shaft 16, 18, 20, respectively, and read against numbered dials on a plate 64 as most clearly illustrated in FIG. 2.

The use of the code tracks A–F having the special code of the present invention eliminates the problem of brush and code tolerances. With this code, only one bit changes in going from one position on the code to the next, as will be described in greater detail hereinafter. Consequently when the brushes are close to a transition point, the actual readout will be one position or a position next to it, depending only on the one code track and brush that will change between the two positions. The problem of overcoming the ambiguity between drums is more difficult; however, before describing the manner in which the present invention solves this problem, the problem itself will first be described in connection with the visual readout dials illustrated in FIG. 2. When a person is visually reading the number indicated by the pointers 58, 60, 62, he automatically eliminates any ambiguity by noticing the position of two adjacent pointers to determine the position of the pointer he is reading. Thus, with the pointers in the position illustrated in FIG. 2, the number would be read as 691, not 791 or 781 or 681, by noticing that the units pointer is reading above the zero point, which means that the tens pointer is slightly above its transition from 80 to 90. Since the tens pointer is below its 90 to 100 transition, this means that the hundreds pointer is slightly below its 600 to 700 transition.

In accordance with the present invention, this visual readout technique is accomplished electronically by providing the following code on the tracks A–F illustrated in FIG. 1.

I

| Decimal Number | Code Tracks | | | | | |
|---|---|---|---|---|---|---|
| | A | B | C | D | E | F |
| 0 | 0 | 0 | 1 | 0 | 0 | 0 |
| 0¼ | 0 | 0 | 1 | 0 | 0 | 1 |
| 0½ | 0 | 0 | 1 | 0 | 1 | 1 |
| 0¾ | 0 | 0 | 1 | 0 | 1 | 0 |
| 1 | 0 | 1 | 1 | 0 | 1 | 0 |
| 1¼ | 0 | 1 | 1 | 0 | 1 | 1 |
| 1½ | 0 | 1 | 1 | 0 | 0 | 1 |
| 1¾ | 0 | 1 | 1 | 0 | 0 | 0 |
| 2 | 0 | 1 | 1 | 1 | 0 | 0 |
| 2¼ | 0 | 1 | 1 | 1 | 0 | 1 |
| 2½ | 0 | 1 | 1 | 1 | 1 | 1 |
| 2¾ | 0 | 1 | 1 | 1 | 1 | 0 |
| 3 | 0 | 1 | 0 | 1 | 1 | 0 |
| 3¼ | 0 | 1 | 0 | 1 | 1 | 1 |
| 3½ | 0 | 1 | 0 | 1 | 0 | 1 |
| 3¾ | 0 | 1 | 0 | 1 | 0 | 0 |
| 4 | 0 | 1 | 0 | 0 | 0 | 0 |
| 4¼ | 0 | 1 | 0 | 0 | 0 | 1 |
| 4½ | 0 | 1 | 0 | 0 | 1 | 1 |
| 4¾ | 0 | 1 | 0 | 0 | 1 | 0 |
| 5 | 1 | 1 | 0 | 0 | 1 | 0 |
| 5¼ | 1 | 1 | 0 | 0 | 1 | 1 |
| 5½ | 1 | 1 | 0 | 0 | 0 | 1 |
| 5¾ | 1 | 1 | 0 | 0 | 0 | 0 |
| 6 | 1 | 1 | 0 | 1 | 0 | 0 |
| 6¼ | 1 | 1 | 0 | 1 | 0 | 1 |
| 6½ | 1 | 1 | 0 | 1 | 1 | 1 |
| 6¾ | 1 | 1 | 0 | 1 | 1 | 0 |
| 7 | 1 | 1 | 1 | 1 | 1 | 0 |
| 7¼ | 1 | 1 | 1 | 1 | 1 | 1 |
| 7½ | 1 | 1 | 1 | 1 | 0 | 1 |
| 7¾ | 1 | 1 | 1 | 1 | 0 | 0 |
| 8 | 1 | 1 | 1 | 0 | 0 | 0 |
| 8¼ | 1 | 1 | 1 | 0 | 0 | 1 |
| 8½ | 1 | 1 | 1 | 0 | 1 | 1 |
| 8¾ | 1 | 1 | 1 | 0 | 1 | 0 |
| 9 | 1 | 0 | 1 | 0 | 1 | 0 |
| 9¼ | 1 | 0 | 1 | 0 | 1 | 1 |
| 9½ | 1 | 0 | 1 | 0 | 0 | 1 |
| 9¾ | 1 | 0 | 1 | 0 | 0 | 0 |

With this code, it will be noted that each decimal number N on each drum is broken down into four quadrants, N, N+¼, N+½, N+¾ and the number N itself is encoded using tracks A, B, C and D as follows:

II

| N | A | B | C | D |
|---|---|---|---|---|
| 0 | 0 | 0 | 1 | 0 |
| 1 | 0 | 1 | 1 | 0 |
| 2 | 0 | 1 | 1 | 1 |
| 3 | 0 | 1 | 0 | 1 |
| 4 | 0 | 1 | 0 | 0 |
| 5 | 1 | 1 | 0 | 0 |
| 6 | 1 | 1 | 0 | 1 |
| 7 | 1 | 1 | 1 | 1 |
| 8 | 1 | 1 | 1 | 0 |
| 9 | 1 | 0 | 1 | 0 |

It will also be noticed that the fractional positions or quadrants N, N+¼, N+½ and N+¾ are encoded using tracks E and F, and that for N even the following holds true:

| | E | F |
|---|---|---|
| N | 0 | 0 |
| N+¼ | 0 | 1 |
| N+½ | 1 | 1 |
| N+¾ | 1 | 0 |

and for N odd the following holds true:

| | E | F |
|---|---|---|
| N | 1 | 0 |
| N+¼ | 1 | 1 |
| N+½ | 0 | 1 |
| N+¾ | 0 | 0 |

In Code II above it will be observed that only one bit changes between N, N+¼, N+½ and N+¾ and that there is no change between N−¾ even and N odd, or between N−¾ odd and N even. With this arrangement the value of the code tracks A, B, C and D remains the same while the bit changes take place in code tracks E and F only, and E and F remain the same when a bit change takes place in a track A, B, C or D.

To decode the number on each drum it is necessary to know the fractional or quadrant position, whether N is odd or even, and whether the next least significant digit reading is between 0 and 4 or between 5 and 9. It will be observed that code track A of Code I provides the 0–4 or 0–5 information directly since it produces a 0 bit for numbers between 0–4 and a 1 bit for numbers between 5–9.

The information as to the quadrant position and whether the next least significant decade reading is between 0–4 or 5–9 is correlated by the following code:

III

| Drum to be Decoded | Next Least Significant Drum Reading | Decode As |
|---|---|---|
| N | 0, 1, 2, 3, 4 | N |
| N | 5, 6, 7, 8, 9 | N−1 |
| N+¼ | 0, 1, 2, 3, 4, 5, 6, 7, 8, 9 | N |
| N+½ | 0, 1, 2, 3, 4, 5, 6, 7, 8, 9 | N |
| N+¾ | 0, 1, 2, 3, 4 | N+1 |
| N+¾ | 5, 6, 7, 8, 9 | N |

From this it can be seen that if the brushes and tracks of the drum 24, for example indicate a whole number N such as 9 and the brushes and tracks on the next least significant drum indicate a number between 0 and 4, the 9 is decoded as 9. However, if the next least significant drum reading is between 5 and 9, the number 9 is decoded as N—1 which is 8. Actually this latter condition means that the number N being read out of the drum 24 is in error by 1, and must be corrected by subtracting 1, suitable circuitry being provided for accomplishing this as will be described hereinafter in connection with FIG. 3. If the number read out from the drum 24 is 9+¼ or 9+½, the number is decoded as 9, regardless of the reading of the next least significant drum. However, when the number read out is 9+¾ and the next least significant drum reading is 0–4, this means that the number 9 being read out is one less than it should be and must be corrected by adding 1, as indicated by Code III above. Finally, if the number read out from the drum is 9+¾ and the next least significant drum reading is between 5 and 9, the number is correct and is decoded as 9.

As stated previously, it is necessary to know whether the number N is odd or even since the code tracks E F are reversed for odd and even numbers. If this odd-even information were not provided and a transition was made from 0+¾ to 1, the tracks E and F would indicate ¾ in both positions and the number 1 would be read out as 1+¾ rather than 1. However, by providing a signal, as will be described, to indicate whether the number N is odd or even, a correct reading is obtained.

In Code I set forth above track A automatically provides an indication of whether the decimal number is between 0–4 or 5–9. This code also can be decoded using standard grey to true binary conversion logic to produce a true binary excess 3 code in which the values of A, B, C and D are converted in accordance with the following tabulation:

IV

| N | Code I A | B | C | D | True Excess 3 A | B | C | D |
|---|---|---|---|---|---|---|---|---|
| 0 | 0 | 0 | 1 | 0 | 0 | 0 | 1 | 1 |
| 1 | 0 | 1 | 1 | 1 | 0 | 1 | 0 | 0 |
| 2 | 0 | 1 | 1 | 1 | 0 | 1 | 0 | 1 |
| 3 | 0 | 1 | 0 | 1 | 0 | 1 | 1 | 0 |
| 4 | 0 | 1 | 0 | 0 | 0 | 1 | 1 | 1 |
| 5 | 1 | 1 | 0 | 0 | 1 | 0 | 0 | 0 |
| 6 | 1 | 1 | 0 | 1 | 1 | 0 | 0 | 1 |
| 7 | 1 | 1 | 1 | 1 | 1 | 0 | 1 | 0 |
| 8 | 1 | 1 | 1 | 0 | 1 | 0 | 1 | 1 |
| 9 | 1 | 0 | 1 | 0 | 1 | 1 | 0 | 0 |

It will be observed that the bit in track D when converted to true excess 3, is a 1 when the number N is even and a 0 when the number N is odd. This information is used to provide the odd-even signal mentioned above.

Figure 3:
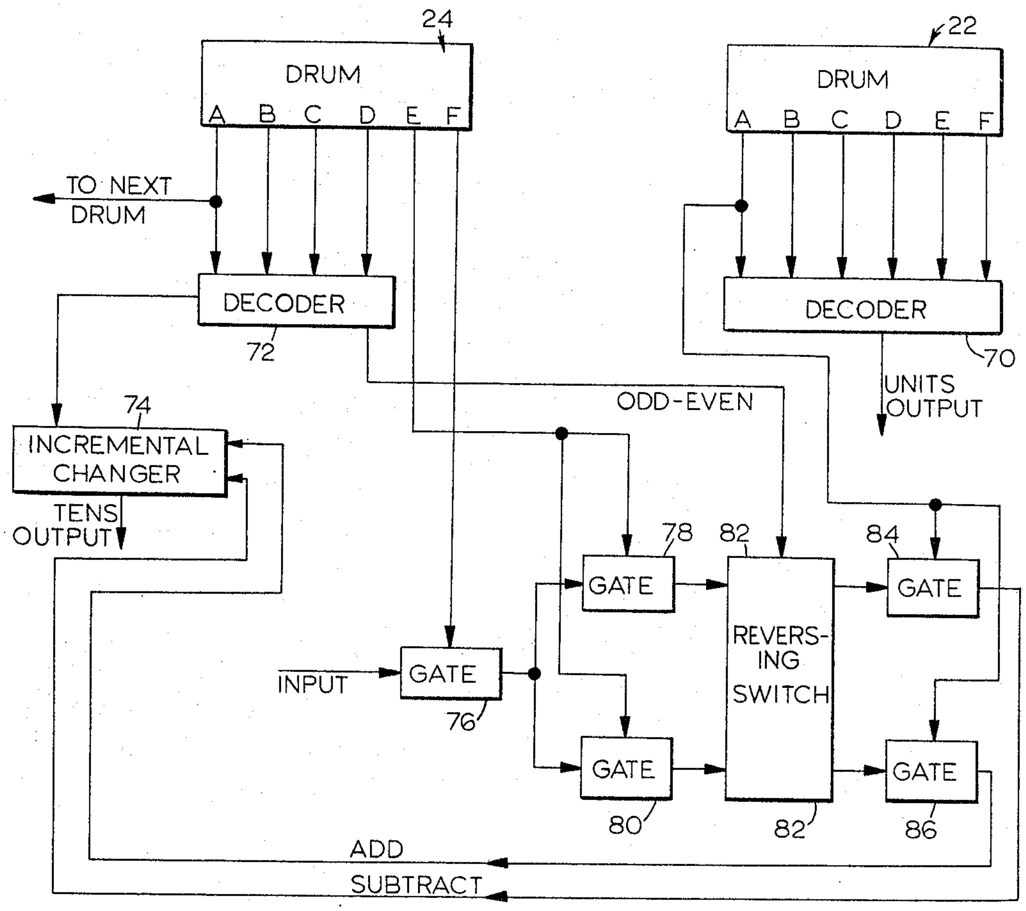
FIG. 3 is a schematic block diagram of one type of circuit which may be used with the structure fo FIG 1.

Referring to FIG. 3, a suitable circuit for decoding the numbers on the drums is there illustrated in block form. The output from the code tracks A–F of the drum 22 is fed to a decoder which converts this into a units output indicating the number on the drum 22. If desired, the E and F code tracks may be eliminated from the drum 22 since the fractional information provided thereby is not needed, the units number being obtained directly from the code tracks A, B, C and D. The code tracks A, B, C and D of the drum 24 are similarly applied to a decoder 72 which converts the binary numbers of these code tracks to true binary excess 3 code numbers as previously described. The decoder 72 produces a first output signal indicating whether the number on the drum is odd or even and this signal is applied to a reversing switch 82. Referring back to Table IV, it will be recalled that the bit of the D code track of the true excess 3 code is a 1 when the number is even and a 0 when the true excess 3 code number is odd. The decoder 72 also has a second output indicating the true excess 3 code number itself which is applied to an incremental changer 74. The incremental changer either passes the number directly therethrough or adds or subtracts 1 in accordance with add or subtract signals applied thereto as will be described.

The output from code track F of the drum 24 is applied directly to a blocking gate 76 to control the passage of an input signal therethrough and the signal from the blocking gate 76 is applied to both an enabling gate 78 and a blocking gate 80. The output from the code track E of the drum 24 is applied directly to the gates 78 and 80, and the signal from these gates is applied to the reversing switch 82 which is controlled by the odd-even signal from the decoder 72 so as to pass signals from the gates 78 and 80 directly through to a gate 84 and blocking gate 86, respectively, when the decimal number on the drum 24 is odd and to apply the signal from the gate 78 to the gate 86 and the signal from the gate 80 to the gate 84 when the decimal number is even. The gates 84 and 86 in turn are controlled by the output from code track A of the drum 22 so that the blocking gate 86 will deliver an add signal to the incremental changer 74 when the bit of the code track A is a 0 (indicating that the decimal number is between 0 and 4) and will disable this gate when the bit is a 1 (indicating that the decimal number is 5–9). Conversely, the gate 84 will have an enabling signal applied thereto when the bit in the code track A is a 1 to apply a subtract signal to the incremental changer 74 and when the bit of the code track A is a 0, the gate 84 will be disabled.

To assist in understanding the operation of the circuit of FIG. 3, several specific examples will now be given. Assuming that the decimal number on the drum 24 is 0, and the decimal number on the drum 22 is between 0–4, the decoder 72 will decode this number and apply it directly to the incremental changer 74. Since the number is even, the D bit of the true excess 3 code as shown above will be a 1 and a signal will be applied to the reversing switch 82 to reverse it so as to connect the gate 78 to the gate 86 and the gate 80 to the gate 84. The bit of the code track F of the drum 24 will be a 0, as will be seen from Code I above, and therefore the blocking gate 76 will apply a signal to both gates 78 and 80. Since the E bit of the drum 24 is also a 0, the gate 78 will be disabled and the gate 80 will apply a signal to the gate 84 through the reversing switch 82. However, since the decimal number of the drum 22 is between 0–4, the gate 84 is disabled and a subtract signal is not applied to the incremental changer. Therefore the output of the incremental changer will indicate a 0, which is in accordance with Code III above. However, if the decimal number on the drum 22 is between 5–9, the bit of the code track A on the drum 22 would be a 1 and an output pulse would accordingly be applied to enable the gate 84 so that a subtract signal would be applied to the incremental changer to change the output thereof from 0 to 9 by subtracting 1.

If the number on the drum 24 is either 0+¼ or 0+½, the F track of the drum 24 would be a 1 and a signal would be applied directly to the blocking gate 76 to disable it. Consequently, neither a subtract nor add pulse would be applied to the incremental changer, and the number 0 would be read out directly without change. However, if the decimal number on the drum 24 is 0+¾, the F track of the code of Table 1 would be a 0, which means that the gate 76 would apply a signal to both the gates 78 and 80. Since the E track of drum 24 is now a 1, the gate 78 would be enabled and the gate 80 would be disabled, so that the output signal from the gate 78 would be applied directly to the blocking gate 86. If the number on the drum 22 is between 0–4, the gate 86 would apply an add signal to the incremental changer to add 1 to the output thereof so that the number would be changed from 0 to 1 in accordance with the Code III. However, if the decimal number of the drum 22 is between 5–9, a signal would be applied to the gate 86 to block it and the add signal would not be applied to the incremental changer so that the output thereof would indicate the number 0.

Now assuming that the decimal number on the drum 24 is an odd number such as 1, for example, the F code track of the drum 24 would be a 0 so that the blocking gate 76 would pass a signal therethrough to the gates 78 and 80. Since the E track of the drum 24 would be a 1, the gate 78 would be enabled to pass the signal therethrough and the gate 80 would block the signal applied thereto. Since the number is odd, the reversing switch 82 would be reversed by the signal from the decoder 72 to apply the output from the gate 78 to the gate 84. Now assuming that the decimal number of the drum 22 is between 0–4, the code track A in the drum 22 would be a 0 so that the gate 84 would not be enabled and no signal would be applied to the incremental changer, which therefore would indicate the number 1. However, if the decimal number of the drum 22 is between 5–9, the code track A of drum 22 would be a 1 and the gate 84 would be enabled to apply a subtract signal to the incremental changer to subtract 1 so that the output thereof would indicate a 0 in accordance with the Code III. As before, if the decimal number of the drum 24 is 1+¼ or 1 +½, the F track of the drum 24 would be a 1 and a signal would be applied to the blocking gate 76 to block off the input signal so that neither a subtract or add signal would be applied to the incremental changer. Now if the decimal number of the drum 24 is 1+¾, the blocking gate 76 will again pass the signal therethrough to the gates 78 and 80 and since the E track of the drum 24 would now be a 0, only the blocking gate 80 would pass a signal therethrough to the gate 86. If the decimal number on the drum 22 is between 0–4, the A track bit will be a 0 and a signal will pass through the gate 86 so that an add signal will be applied to the incremental changer. If the number on the drum 22 is between 5–9 the A track bit will be a 1 and the gate 86 will block the signal so that the add signal will not be applied to the incremental changer.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims. For example, although Code I described above has the important advantages of providing a direct indication of the 0–4 or 5–9 reading of each drum by means of the A track bit thereof and being readily convertible to a true binary excess 3 code having a D bit which directly indicates whether the decimal number is odd or even, other binary number codes could be used and still fall within the purview of the present invention. The A B C and D tracks could have the binary numbers therein in a true excess 3 code, for example, so that the D bit would give the odd-even signal directly before decoding and the true excess 3 number could then be decoded in a manner to provide the information as to whether the number is between 0–4 and 5–9. The incremental changer and gating circuit would be controlled by this information, including the E F track information, as already described.

Also, although the invention has been described in connection with a decimal numbering system, it is apparent that it could be used in connection with other numbering systems, such as an octal numbering system, if desired.

What is claimed is:

1. An analog to binary decimal encoder comprising first and second carriages mechanically interconnected so that said second carriage rotates once for every ten revolutions of said first carriage, a plurality of code tracks on said second carriage divided into a first group of code tracks for indicating decimal numbers from 0 to 9 in binary form and a second group of code tracks for indicating fractions of each of the numbers in binary form, said first carriage having a plurality of code tracks thereon including at least a first group of code tracks for indicating decimal numbers from 0 to 9 in binary form, and means for reading out the binary number indicated by said first group of code tracks on said second carriage, said means including means for adding and subtracting one in response to information received from said second group of code tracks of said second carriage and from information indicating whether the number on said first group of code tracks of said first carriage is between 0 and 4 or 5 and 9.

2. An analog to binary decimal encoder comprising first and second carriages mechanically interconnected so that said second carriage rotates once for every ten revolutions of said first carriage, a plurality of code tracks on said second carriage divided into a first group of code tracks for indicating decimal numbers from 0 to 9 in binary form and a second group of code tracks for indicating fractions of each of said decimal numbers in binary form, said first carriage having a plurality of code tracks thereon including at least a first group of code tracks for indicating decimal numbers from 0 to 9 in binary form, and means for reading out the binary numbers indicated by the code tracks on said carriages, said means including incremental changer means for indicating the binary number of said first group of code tracks on said second carriage, and circuit means connected to said incremental changer means for adding and subtracting one when necessary to compensate for transition errors in going from one number to the next, said circuit means being controlled by the fractional number indicated by said second group of code tracks on said second carriage and a signal from said first group of code tracks on said first carriage indicating whether the decimal number thereof is between 0 and 4 or 5 and 9.

3. The invention as defined in claim 2 wherein said carriages are mechanically connected by spur gears.

4. The invention as defined in claim 2 wherein said readout means comprises a decoder for decoding the information received from said first group of code tracks on said second carriage, an incremental changer connected to said decoder, first gate means controlled by said second group of code tracks for providing a first output signal when the decimal number is a whole number and a second output signal when the decimal number is a whole number plus the final fraction before transition to the next whole number, and second gate means controlled by the first group of code tracks on said first carriage for passing said first and second signals to said incremental changer as subtract or add signals respectively according to whether the decimal number on said first carriage is between 0 through 4 or 5 through 9.

5. The invention as defined in claim 4 wherein said circuit means applies an add or subtract signal to said incremental changer in accordance with the following code in which N is the decimal number indicated by the second carriage;

| Track to be Decoded | Next Least Significant Track Reading | Decode As |
|---|---|---|
| N | 0, 1, 2, 3, 4 | N |
| N | 5, 6, 7, 8, 9 | N−1 |
| N+¼ | 0, 1, 2, 3, 4, 5, 6, 7, 8, 9 | N |
| N+½ | 0, 1, 2, 3, 4, 5, 6, 7, 8, 9 | N |
| N+¾ | 0, 1, 2, 3, 4 | N+1 |
| N+¾ | 5, 6, 7, 8, 9 | N |

6. An analog to binary decimal encoder comprising first and second carriages mechanically interconnected so that said second carriage rotates once for every ten revolutions of said first carriage, a plurality of code tracks on said second carriage divided into a first group of code tracks A B C and D for indicating decimal numbers from 0 to 9 in binary form and a second group of code tracks E and F for indicating fractions of each of the numbers in binary form, said first carriage having a plurality of code tracks thereon including at least said first group of code tracks A B C and D for indicating decimal numbers from 0 to 9 in binary form, said first and second groups of code tracks having the following code:

| Decimal Number | Code Tracks | | | | | |
|---|---|---|---|---|---|---|
| | A | B | C | D | E | F |
| 0 | 0 | 0 | 1 | 0 | 0 | 0 |
| 0¼ | 0 | 0 | 1 | 0 | 0 | 1 |
| 0½ | 0 | 0 | 1 | 0 | 1 | 1 |
| 0¾ | 0 | 0 | 1 | 0 | 1 | 0 |
| 1 | 0 | 1 | 1 | 0 | 1 | 0 |
| 1¼ | 0 | 1 | 1 | 0 | 1 | 1 |
| 1½ | 0 | 1 | 1 | 0 | 0 | 1 |
| 1¾ | 0 | 1 | 1 | 0 | 0 | 0 |
| 2 | 0 | 1 | 1 | 1 | 0 | 0 |
| 2¼ | 0 | 1 | 1 | 1 | 0 | 1 |
| 2½ | 0 | 1 | 1 | 1 | 1 | 1 |
| 2¾ | 0 | 1 | 1 | 1 | 1 | 0 |
| 3 | 0 | 1 | 0 | 1 | 1 | 0 |
| 3¼ | 0 | 1 | 0 | 1 | 1 | 1 |
| 3½ | 0 | 1 | 0 | 1 | 0 | 1 |
| 3¾ | 0 | 1 | 0 | 1 | 0 | 0 |
| 4 | 0 | 1 | 0 | 0 | 0 | 0 |
| 4¼ | 0 | 1 | 0 | 0 | 0 | 1 |
| 4½ | 0 | 1 | 0 | 0 | 1 | 1 |
| 4¾ | 0 | 1 | 0 | 0 | 1 | 0 |
| 5 | 1 | 1 | 0 | 0 | 1 | 0 |
| 5¼ | 1 | 1 | 0 | 0 | 1 | 1 |
| 5½ | 1 | 1 | 0 | 0 | 0 | 1 |
| 5¾ | 1 | 1 | 0 | 0 | 0 | 0 |
| 6 | 1 | 1 | 0 | 1 | 0 | 0 |
| 6¼ | 1 | 1 | 0 | 1 | 0 | 1 |
| 6½ | 1 | 1 | 0 | 1 | 1 | 1 |
| 6¾ | 1 | 1 | 0 | 1 | 1 | 0 |
| 7 | 1 | 1 | 1 | 1 | 1 | 0 |
| 7¼ | 1 | 1 | 1 | 1 | 1 | 1 |
| 7½ | 1 | 1 | 1 | 1 | 0 | 1 |
| 7¾ | 1 | 1 | 1 | 1 | 0 | 0 |
| 8 | 1 | 1 | 1 | 0 | 0 | 0 |
| 8¼ | 1 | 1 | 1 | 0 | 0 | 1 |
| 8½ | 1 | 1 | 1 | 0 | 1 | 1 |
| 8¾ | 1 | 1 | 1 | 0 | 1 | 0 |
| 9 | 1 | 0 | 1 | 0 | 1 | 0 |
| 9¼ | 1 | 0 | 1 | 0 | 1 | 1 |
| 9½ | 1 | 0 | 1 | 0 | 0 | 1 |
| 9¾ | 1 | 0 | 1 | 0 | 0 | 0 |

and means for reading out the binary number indicated by said first group of code tracks on said second carriage, said means including means for adding and subtracting one in response to information received from said second group of code tracks of said second carriage and information received from the A code track of the first group of code tracks on said first carriage indicating whether the number on the first carriage is between 0 and 4 or 5 and 9.

7. An analog to binary decimal encoder comprising a plurality of carriages geared together with ten to one gearing ratios so that each carriage rotates once for each ten revolutions of the next least significant carriage with the least significant carriage being a units carriage adapted to be rotated directly by a shaft input, code means on said carriages for indicating the whole decimal numbers thereof in binary form and fractions of said decimal numbers in binary form, means for reading out each of the whole numbers on each of said carriages, and means for adding or subtracting one from each of the whole numbers read out from each carriage greater than the units carriage in response to information based on the fractional number of the carriage being read out and information indicating whether the number on the next least most significant carriage is between 0 and 4 or 5 and 9.

References Cited by the Examiner

UNITED STATES PATENTS

| | | | |
|---|---|---|---|
| 2,666,912 | 5/1954 | Gow et al. | 340—347 |
| 2,779,539 | 1/1957 | Darlington | 340—347 |
| 2,796,566 | 6/1957 | Maynard et al. | 340—347 |
| 2,813,677 | 11/1957 | Scarbrough | 340—347 |
| 2,818,557 | 12/1957 | Link et al. | 340—347 |
| 2,826,252 | 3/1958 | Dickstein | 340—347 |
| 2,852,764 | 9/1958 | Frothingham | 340—347 |
| 2,866,184 | 12/1958 | Gray | 340—347 |
| 2,966,670 | 12/1960 | Foss | 340—347 |
| 3,034,175 | 5/1962 | Wagner | 340—347 |

OTHER REFERENCES

Note on Analog-Digital Conversion Techniques, Susskind, pp. 3–1 through 3–17 relied on.

MAYNARD R. WILBUR, *Primary Examiner.*

DARYL W. COOK, MALCOLM A. MORRISON, *Examiners.*

K. R. STEVENS, *Assistant Examiner.*